(12) United States Patent
Yeh et al.

(10) Patent No.: US 7,898,604 B2
(45) Date of Patent: Mar. 1, 2011

(54) THREE-DIMENSION DISPLAY

(75) Inventors: Pi-Chun Yeh, Hsinchu (TW); Yue-Shih Jeng, Hsinchu (TW); Chih-Jen Hu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 12/882,209

(22) Filed: Sep. 15, 2010

(65) Prior Publication Data

US 2011/0002037 A1    Jan. 6, 2011

Related U.S. Application Data

(63) Continuation of application No. 12/035,436, filed on Feb. 22, 2008, now Pat. No. 7,821,583.

(30) Foreign Application Priority Data

Dec. 3, 2007 (TW) .............................. 96146008 A

(51) Int. Cl.
*H04N 13/00* (2006.01)
*G02F 1/13* (2006.01)
*H01J 9/20* (2006.01)

(52) U.S. Cl. ............... 349/15; 349/13; 349/123; 349/96; 349/98; 348/58; 445/24

(58) Field of Classification Search ............... 349/13, 349/14, 11, 9, 15, 96, 97, 98, 104, 108, 187, 349/191, 123, 126, 128, 129; 348/58; 445/24
See application file for complete search history.

(56) References Cited

U.S. PATENT DOCUMENTS

| 4,870,486 A * | 9/1989 | Nakagawa et al. ............. 349/15 |
| 5,956,001 A * | 9/1999 | Sumida et al. ................. 345/55 |
| 6,020,941 A * | 2/2000 | Ma ................................. 349/15 |
| 6,094,242 A * | 7/2000 | Yamanaka ..................... 349/13 |
| 6,485,884 B2 * | 11/2002 | Wolk et al. .................... 430/200 |
| 6,703,989 B1 * | 3/2004 | Harrold et al. ................. 345/32 |
| 7,221,332 B2 * | 5/2007 | Miller et al. .................... 345/32 |
| 2005/0151152 A1 * | 7/2005 | Miller et al. .................. 257/103 |
| 2009/0141201 A1 * | 6/2009 | Yeh et al. ....................... 349/15 |

* cited by examiner

*Primary Examiner* — Brian M Healy
(74) *Attorney, Agent, or Firm* — Jianq Chyun IP Office

(57) ABSTRACT

A three-dimension display suitable for a viewer wearing a pair of eyeglasses is disclosed. The eyeglasses have two circular polarized eyeglass lenses with different polarizations. The three-dimension display includes a flat display panel, a quarter-wave plate and a patterned half-wave plate. The flat display panel has a plurality of pixels arranged in an array, wherein the flat display panel is suitable to display a linear polarized image. The quarter-wave plate is disposed between the flat display panel and the eyeglasses. The patterned half-wave plate is disposed between the flat display panel and the eyeglasses, wherein the patterned half-wave plate corresponds to a part of the pixels. The present invention also provides a fabrication method of a three-dimension display.

11 Claims, 16 Drawing Sheets

THREE-DIMENSION DISPLAY

CROSS-REFERENCE TO RELATED APPLICATION

This is a continuation application of and claims the priority benefit of an application Ser. No. 12/035,436, filed on Feb. 22, 2008, now U.S. Pat. No. 7,821,583, which claims the priority benefit of Taiwan application serial no. 96146008, filed on Dec. 3, 2007. The entirety of each of the above-mentioned patent applications is hereby incorporated by reference herein and made a part of this specification.

BACKGROUND OF THE INVENTION

1. Field of the Invention

The present invention generally relates to a display, and more particularly, to a three-dimension display (3D-display) with a liquid crystal display panel (LCD panel) capable of providing images in different polarizations from the different regions thereof.

2. Description of Related Art

Along with the progresses and developments of science and technology, the people's enjoyments on recreation and spiritual levels are steadily increasing and never declining. In terms of the spiritual demands, in the age of science and technology dazzlingly changed, people expect to experience the fantastic imaginations by means of a display apparatus so as to have the effect of being physically on the scene. Therefore, how to make a display apparatus produce 3D images or pictures has become an object to be desiderating achieved in the display technology field today.

In terms of appearance, the 3D-display technology can roughly be categorized into stereoscopic display mode in which a viewer needs to wear a pair of eyeglasses with specific design and auto-stereoscopic display mode provided to a viewer for directly viewing, wherein the stereoscopic display can be further divided into color filter glasses, polarized glasses and shutter glasses. The stereoscopic 3D-display is based on that the display produces images with specific information for left-right eyes, followed by selecting of a pair of eyeglasses wearing on head so as to enable the left-right eyes of the viewer to see the left-right images for establishing a stereo visual perception.

FIG. 1 is a display principle diagram of a 3D-display for a viewer with polarized eyeglasses. Referring to FIG. 1, a 3D-display 100 is suitable for a viewer wearing a pair of polarized eyeglasses 110, wherein the polarized eyeglasses 110 have two linear polarized eyeglasses lenses respectively having a polarization D1 and a polarization D2. The 3-D display 100 includes a flat display panel 120 and a patterned half-wave plate 130, wherein the patterned half-wave plate 130 is disposed between the flat display panel 120 and the polarized eyeglasses 110. As shown by FIG. 1, the flat display panel 120 has a plurality of pixels arranged in array, and the odd-row pixels and even-row pixels on the flat display panel 120 respectively display a right eye frame R and a left eye frame L, as shown by a frame F1 in FIG. 1. In addition, the flat display panel 120 has an upper polarized plate 140 with an optical axis having an extension direction parallel to the polarization D1, so as to make the flat display panel 120 suitable to display a linear polarized image with the polarization D1. The patterned half-wave plate 130 includes a plurality of bar patterns B, each of which provides a phase retardation, and the phase retardation enables the linear polarized image with the polarization D1 to be converted into a linear polarized image with a polarization D2. Each of the bar patterns B respectively correspond to a row of pixels in the odd-row, so that the image presented by the odd-row pixels displays a right eye frame R with the polarization D2 after passing through the bar patterns B, as shown by the frame F2 in FIG. 1. When the viewer wears the polarized eyeglasses 110 to watch the 3-D display 100, the linear polarized lenses with different polarizations enable the left eye and the right eye of the viewer to see a left eye frame with the polarization D1 and a right eye frame with the polarization D2 to establish the stereo visual perception.

Although the above-mentioned techniques are able to make a viewer wearing a pair of polarized eyeglasses see 3D-images produced by a flat display successfully, but the viewed 3D-images have high dependence on view angle which may limit the viewing position for a viewer. Therefore, how to reduce the dependence on view angle and expand the viewable angle is one of the developing directions of 3D-displays.

SUMMARY OF THE INVENTION

Accordingly, the present invention is directed to a 3D-display, which is able to reduce the dependence on view angle for a viewer to use the 3D-display.

The present invention is also directed to a fabrication method of a 3D-display, by which two regions with two different circularly-polarized images are produced in the 3D-display to increase the view angle for a viewer to watch 3D-images.

In accordance with the above objectives and other objectives, the present invention provides a 3D-display suitable for a viewer wearing eyeglasses to watch 3D-images, wherein the eyeglasses have two circular polarized eyeglass lenses with two different polarizations. The 3D-display includes a flat display panel, a quarter-wave plate (¼-$\lambda$, plate) and a patterned half-wave plate. The flat display panel has a plurality of pixels arranged in an array, wherein the flat display panel is suitable to display a linear polarized image. The quarter-wave plate is disposed between the flat display panel and the eyeglasses, wherein the patterned half-wave plate corresponds to a part of the pixels.

In an embodiment of the present invention, the flat display panel includes LCD panel (liquid crystal display panel) with linear polarized plate, organic electroluminescent display (OELD) panel, plasma display panel, electro-wetting display panel or the like.

In an embodiment of the present invention, the patterned half-wave plate is disposed on the flat display panel, the quarter-wave plate is disposed on the patterned half-wave plate and the patterned half-wave plate is disposed between the quarter-wave plate and the flat display panel. In an embodiment, the 3D-display further includes a substrate and a first alignment layer. The first alignment layer is disposed on the quarter-wave plate and located between the quarter-wave plate and the substrate, and the optical axis of the quarter-wave plate is parallel to the optical axis of the patterned half-wave plate.

In an embodiment of the present invention, the quarter-wave plate is disposed on the flat display panel, the patterned half-wave plate is disposed on the quarter-wave plate and the quarter-wave plate is disposed between the patterned half-wave plate and the flat display panel. In an embodiment, the 3D-display further includes a substrate and a first alignment layer. The first alignment layer is disposed on the patterned half-wave plate and located between the patterned half-wave plate and the substrate. In an embodiment, the 3D-display further includes a covering layer and a second alignment layer. The covering layer is disposed between the quarter-wave plate and the patterned half-wave plate. The second alignment layer is disposed between the covering layer and the quarter-wave plate. In another embodiment, the 3D-display further includes a covering layer with alignment function, the covering layer is disposed between the quarter-wave plate and the patterned half-wave plate, and the optical axis of the quarter-wave plate is parallel to the optical axis of the patterned half-wave plate.

In an embodiment of the present invention, the patterned half-wave plate includes a plurality of bar patterns, and each bar pattern respectively corresponds to a row of pixels in the even-row pixels.

In an embodiment of the present invention, the patterned half-wave plate includes a plurality of bar patterns, and each bar pattern respectively corresponds to a row of pixels in the odd-row pixels.

In an embodiment of the present invention, the patterned half-wave plate includes a plurality of bar patterns, and each bar pattern respectively corresponds to a column of pixels in the even-column pixels or a column of pixels in the odd-column pixels.

In an embodiment of the present invention, the patterned half-wave plate includes a plurality of island patterns, and each island pattern respectively corresponds to at least one of the pixels. In an embodiment, the island patterns are alternately arranged in the column direction and the row direction.

The present invention also provides a fabrication method of a 3D-display. The method includes following steps. First, a flat display panel having a plurality of pixels arranged in an array and suitable to display linear polarized images is provided. Next, a quarter-wave plate and a patterned half-wave plate are fabricated on a substrate, wherein the patterned half-wave plate corresponds to a part of the pixels. Next, the substrate having the quarter-wave plate and the patterned half-wave plate is adhered the flat display panel.

In an embodiment of the present invention, the fabrication method of the substrate having the quarter-wave plate and the patterned half-wave plate includes following steps. First, a first alignment layer is formed on the substrate. Next, a quarter-wave plate is formed on the first alignment layer. Next, a patterned half-wave plate is formed on the quarter-wave plate.

In an embodiment of the present invention, the fabrication method of the substrate having the quarter-wave plate and the patterned half-wave plate includes following steps. First, a first alignment layer is formed on the substrate. Next, a patterned half-wave plate is formed on the first alignment layer. Next, a quarter-wave plate is formed on the patterned half-wave plate.

In an embodiment of the present invention, the fabrication method of the substrate having the quarter-wave plate and the patterned half-wave plate includes following steps. First, a first alignment layer is formed on the substrate. Next, a patterned half-wave plate is formed on the first alignment layer. Next, a covering layer is formed on the patterned half-wave plate. Next, a second alignment layer is formed on the covering layer. Next, a quarter-wave plate is formed on the second alignment layer.

In an embodiment of the present invention, the fabrication method of the substrate having the quarter-wave plate and the patterned half-wave plate includes following steps. First, a first alignment layer is formed on the substrate. Next, a patterned half-wave plate is formed on the first alignment layer. Next, a covering layer having alignment function is formed on the patterned half-wave plate. Next, a quarter-wave plate is formed on the covering layer having alignment function.

In the 3D-display of the present invention, the different regions of the patterned half-wave plate provide different phase retardations, so that the 3D-display is able to produce left eye frame and right eye frame respectively corresponding to different polarizations and the 3D-display is capable to convert a linear polarized image into a circular polarized image by using quarter-wave. In association with the quarter-wave plate and the patterned half-wave plate is capable for a viewer wearing a pair of polarized eyeglasses see 3D-images with an wider view angle comparing with the prior art, which would largely promote the display quality of 3D-images. In addition, the optical axis of the quarter-wave plate is parallel to the optical axis of the patterned half-wave plate in the present invention, and in the partial embodiments, only a single alignment layer is used to integrate the quarter-wave plate and the patterned half-wave plate. Therefore, the present invention is advantageous in reducing the manufacturing cost as well.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

First Embodiment

Figure 1:
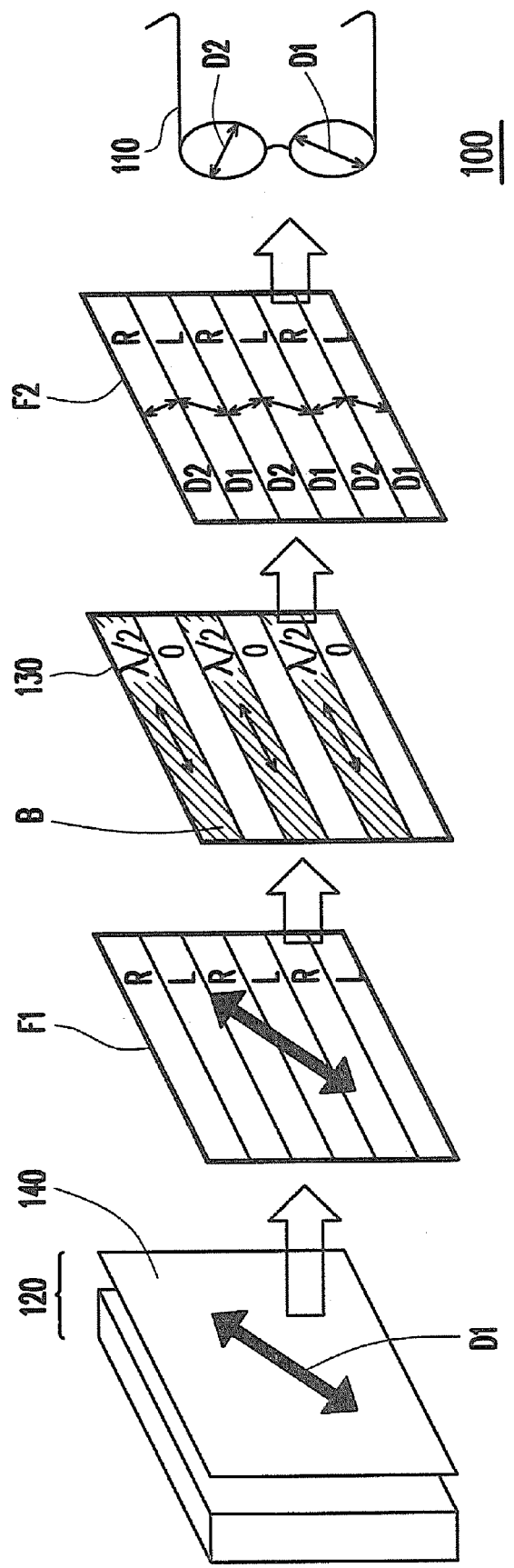
FIG. 1 is a display principle diagram of a 3-D display.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
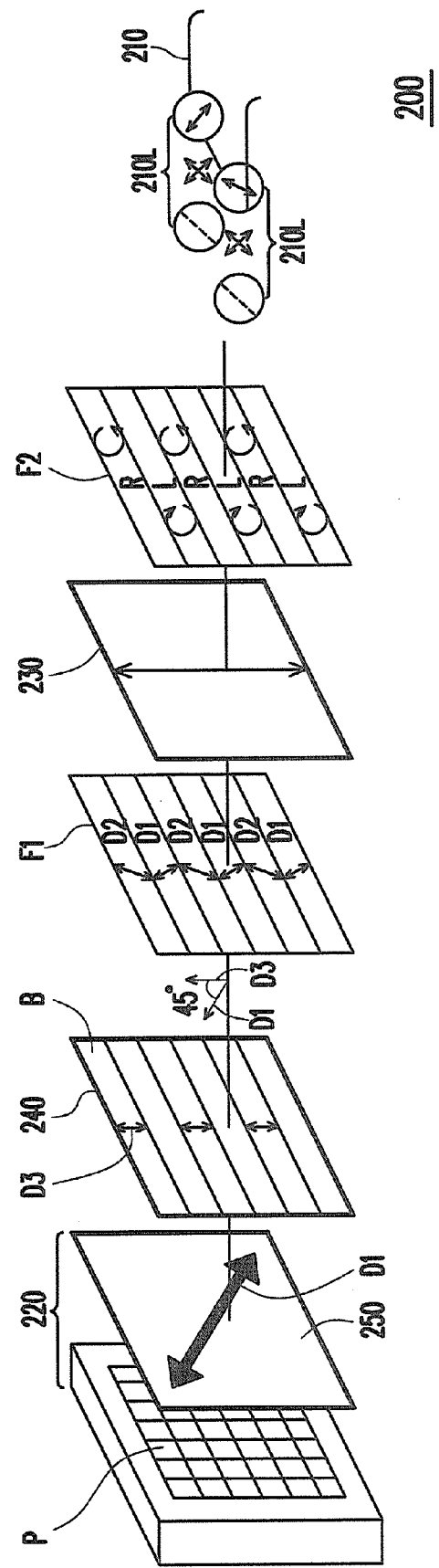
FIG. 2A is a diagram of a 3-D display according to a first embodiment of the present invention.

FIG. 2A is a diagram of a 3-D display according to the first embodiment of the present invention. Referring to FIG. 2A, a 3D-display 200 is suitable for a viewer wearing a pair of circular polarized eyeglasses 210 to watch, wherein the circular polarized eyeglasses 210 have two circular polarized eyeglass lenses 210L with a left-handed circular polarization and a right-handed circular polarization and the circular polarized eyeglass lens 210L can be seen as a combination of a quarter-wave plate and a linear polarized plate as shown by FIG. 2A. In addition, the 3D-display 200 includes a flat display panel 220, a quarter-wave plate 230 and a patterned half-wave plate 240. In the embodiment, the patterned half-wave plate 240 is disposed on the flat display panel 220, the quarter-wave plate 230 is disposed on the patterned half-wave plate 240 and the patterned half-wave plate 240 is located between the quarter-wave plate 230 and the flat display panel 220. The flat display panel 220 can be LCD panel with upper polarized plate, organic electroluminescent display (OELD) panel, plasma display panel or electro-wetting display panel. In the embodiment, the flat display panel 220 is an exemplarily LCD panel with an upper polarized plate.

Still referring to FIG. 2A, the flat display panel 220 has a plurality of pixels P arranged in an array. In the embodiment, the flat display panel 220 has an upper polarized plate 250, wherein the extension direction of the optical axis of the upper polarized plate 250 is notated by D1, and the flat display panel 220 is suitable to display a linear polarized image with a polarization D1. The patterned half-wave plate 240 and the quarter-wave plate 230 are disposed between the flat display panel 220 and the circular polarized eyeglasses 210, and the patterned half-wave plate 240 corresponds to a part of the pixels; for example, the patterned half-wave plate 240 includes a plurality of bar patterns B and each bar patterns B respectively corresponds to a row of pixels P in the odd-row pixels P. In particular, the bar patterns B on the patterned half-wave plate 240 have a phase retardation function, so that the image displayed by the flat display panel 220 after passing through the bar patterns B get a half wavelength ($\lambda/2$) phase retardation.

In more detail, the $\lambda/2$ phase retardation provided by the patterned half-wave plate 240 in association with the odd-row pixels P makes the linear polarized image with the polarization D1 converted into the linear polarized image with the polarization D2 prior to entering the quarter-wave plate 230. Meanwhile, the phase retardation provided by the patterned half-wave plate 240 in association with the even-row pixels is substantially zero, so that the linear polarized image presented by the even-row pixels after passing through the patterned half-wave plate 240 would keep the original polarization D1 to enter the quarter-wave plate 230. The linear polarized image displayed by the flat display panel 220 after passing through the patterned half-wave plate 240 produces a frame F1 as shown by FIG. 2A, wherein the frame F1 is divided into a plurality of bar frames with the polarization D1 and a plurality of bar frames with the polarization D2 and the above-mentioned two groups of frames with D1 and D2 are alternately arranged.

Still referring to FIG. 2A, the $\lambda/4$ phase retardation provided by the quarter-wave plate 230 makes the two groups of linear polarized images with the polarization D1 and the polarization D2 respectively converted into left-handed circular circularly-polarized images and right-handed circular circularly-polarized images to then enter the circular polarized eyeglasses 210 worn by the viewer. As shown by the frame F2 in FIG. 2A, the frame F2 is divided into a plurality of left-eye images L and a plurality of right-eye images R, so that the viewer is able to see a 3D-image superposed by the left-eye image L and the right-eye image R of the frame F2 through the circular polarized eyeglasses 210. Note that, compared to the prior art where a linear polarized image with a linear polarization is used, the circularly-polarized image with a circular polarization provided by the present invention has almost the same amounts corresponding to all the components in each polarization. Therefore, when a viewer wearing the circular polarized eyeglasses 210 watches the 3D-display 200 in different viewing angles, the viewed 3D-image is more even, and the employed quarter-wave plate 230 is helpful to increase the view angle of the 3D-display in this regard.

Figure 2B:
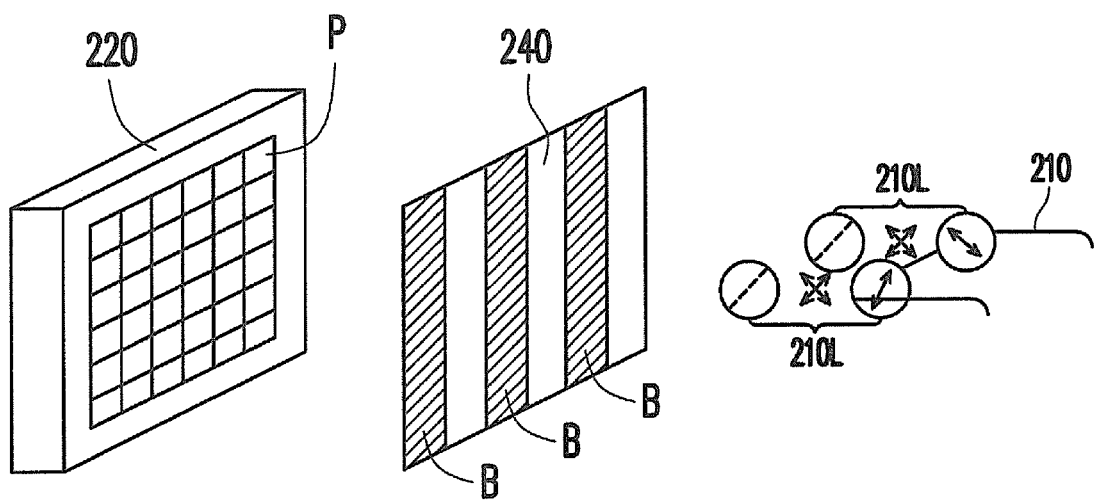
FIG. 2B is a diagram showing an implementation of the patterned half-wave plate in the 3-D display of FIG. 2A.
Figure 2C:
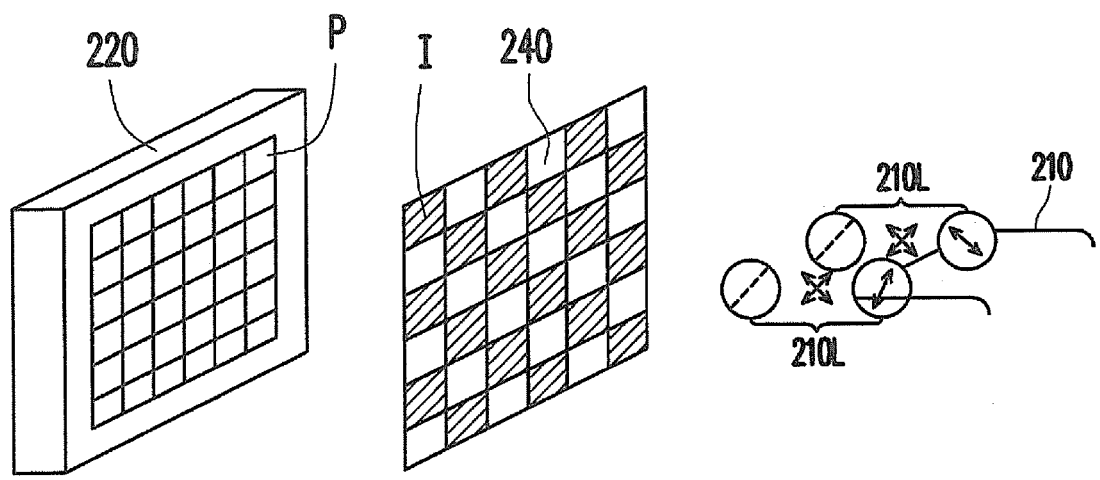
FIG. 2C is a diagram showing another implementation of the patterned half-wave plate in the 3-D display of FIG. 2A.

Each bar pattern B of the patterned half-wave plate 240 can also respectively correspond to a row of pixels P in the even-row pixels P of the flat display panel. In addition, referring to FIGS. 2B and 2C where the relationship between the patterned half-wave plate 240 and the pixels P of the flat display panel is shown, a patterned half-wave plate 240 (other components but the patterned half-wave plate 240 are omitted in the figure) includes a plurality of bar patterns B and each bar patterns B respectively corresponding to a column of pixels P in the odd-column pixels. Alternatively, each bar patterns B can respectively correspond to a column of pixels P in the even-column pixels as well. Referring to FIG. 2C, the patterned half-wave plate 240 (other components but the patterned half-wave plate 240 are omitted in the figure) includes a plurality of island patterns I which are alternately arranged in the column direction and in the row direction and each island pattern I respectively correspond to one of the pixels P, so that the frame has two groups of displayed images alternately arranged as a chessboard, and when the two groups of images pass through the circular polarized eyeglasses 210 worn by the viewer, a 3D-frame is produced. Each island pattern may correspond to a plurality of pixels. Therefore, a designer can specify the relationship between the pattern on the patterned half-wave plate and the pixels of the flat display panel in accordance with the application need. The present invention does not limit the shape, size and arrangement of the patterns on the patterned half-wave plate.

Figure 3:
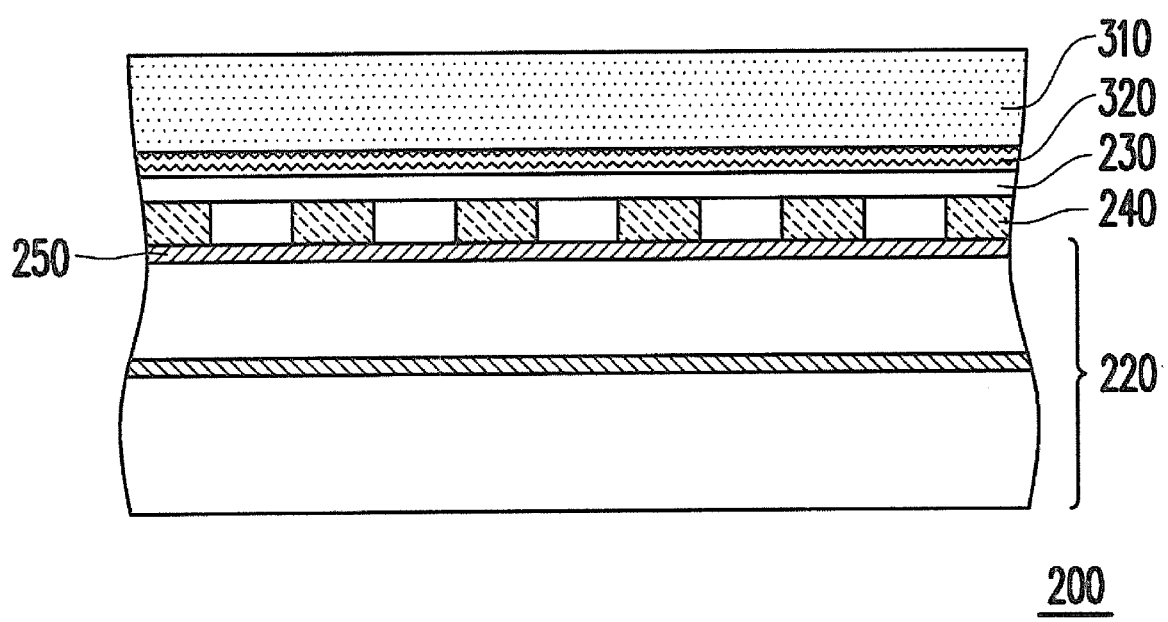
FIG. 3 is a cross sectional diagram of a 3-D display according to the first embodiment of the present invention.

Particularly, the 3D-display 200 includes a substrate 310 and a first alignment layer 320 as shown by FIG. 3. FIG. 3 is a cross sectional diagram of a 3-D display according to the first embodiment of the present invention. Referring to FIG. 3, the first alignment layer 320 is disposed on the quarter-wave plate 230 and located between the quarter-wave plate 230 and the substrate 310, wherein the first alignment layer 320 has a specific alignment arrangement for adjusting the optical axes of the quarter-wave plate 230 and the patterned half-wave plate 240. In the embodiment, the optical axis of the quarter-wave plate 230 is parallel to the optical axis of the patterned half-wave plate 240.

In more detail, the quarter-wave plate 230 and the patterned half-wave plate 240 are made of, for example, phase difference film. The optical behavior of the phase difference film can be adjusted by changing the thickness thereof or the molecular orientation thereof. For example, the quarter-wave plate 230 and the patterned half-wave plate 240 can be made of a same material where the quarter-wave plate 230 and the patterned half-wave plate 240 have different phase retardations by changing the thickness of the phase difference film. In addition, since the optical axis of the quarter-wave plate 230 is parallel to that of the patterned half-wave plate 240 in the embodiment, thus, a single first alignment layer 320 is able to define the optical axes of the quarter-wave plate 230 and the patterned half-wave plate 240, wherein the alignment direction of the first alignment layer 320 can be adjusted by using various contact alignment processes or without contact alignment processes.

In order to more fully describe the present invention, a fabrication method of the 3D-display according to the first embodiment of the present invention is described as follows. FIGS. 4A-4F are diagrams showing the fabrication method of the 3-D display of the present invention. The method includes following steps.

Figure 4A:
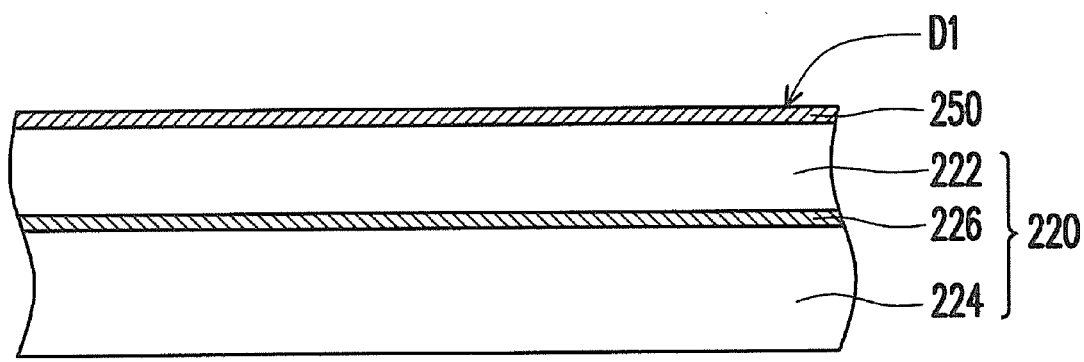
FIGS. 4A-4F are diagrams showing the fabrication method of the 3-D display of the present invention.
Figure 4B:
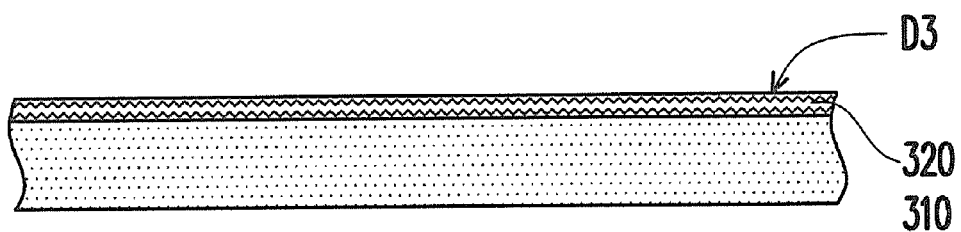

First, referring to FIGS. 2A and 4A, a flat display panel 220 is provided. The flat display panel 220 has a plurality of pixels P arranged in an array and is suitable to display a linear polarized image with a polarization D1. For example, the flat display panel 220 includes, an LCD panel 222, a backlight module 224 and an upper polarized plate 250 and a lower polarized plate 226 located at both sides of the LCD panel 222, wherein the extension direction of the optical axis of the upper polarized plate 250 is D1, which makes the LCD panel 222 suitable to display linear polarized image with the polarization D1. Next, referring to FIG. 4B, a first alignment layer 320 is formed on the substrate 310, wherein the alignment direction of the first alignment layer 320 is D3 which makes the optical axis extension directions of the quarter-wave plate 230 and the patterned half-wave plate 240 become D3, wherein the included angle between the optical axis extension directions D3 of the quarter-wave plate 230 and the patterned half-wave plate 240 and the optical axis extension direction D1 of the upper polarized plate 250 is 45° (as shown by FIG. 2A).

Figure 4C:
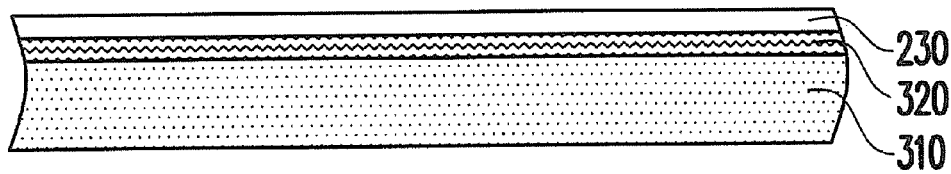
Figure 4D:
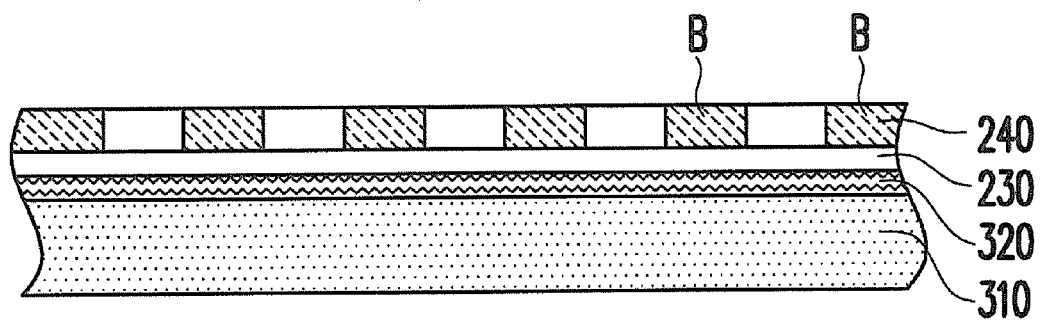

Next, referring to FIG. 4C, a quarter-wave plate 230 is formed on the first alignment layer 320, wherein the fabrication method for the quarter-wave plate 230 is, for example, overall coating a phase difference film on the first alignment layer 320, and the method of coating the phase difference film is, for example, slot-die coating or spin coating through UV (ultraviolet) cross-linking. Next, referring to FIGS. 2A and 4D, a patterned half-wave plate 240 is formed on the quarter-wave plate 230, wherein the patterned half-wave plate 240 corresponds to a part of the pixels P; in the embodiment, the patterned half-wave plate 240 has a plurality of bar patterns B corresponding to the pixels of a row. The above-mentioned method of forming the patterned half-wave plate 240 includes, for example, overall coating a phase difference film on the quarter-wave plate 230, and the method of coating the phase difference film includes, for example, slot-die coating or spin coating, followed by using a photo mask process to define the required bar patterns B, and then, a developing process is used to remove a part of the phase difference film so as to complete the quarter-wave plate 230 and the patterned half-wave plate 240 on the substrate 310.

Figure 4E:
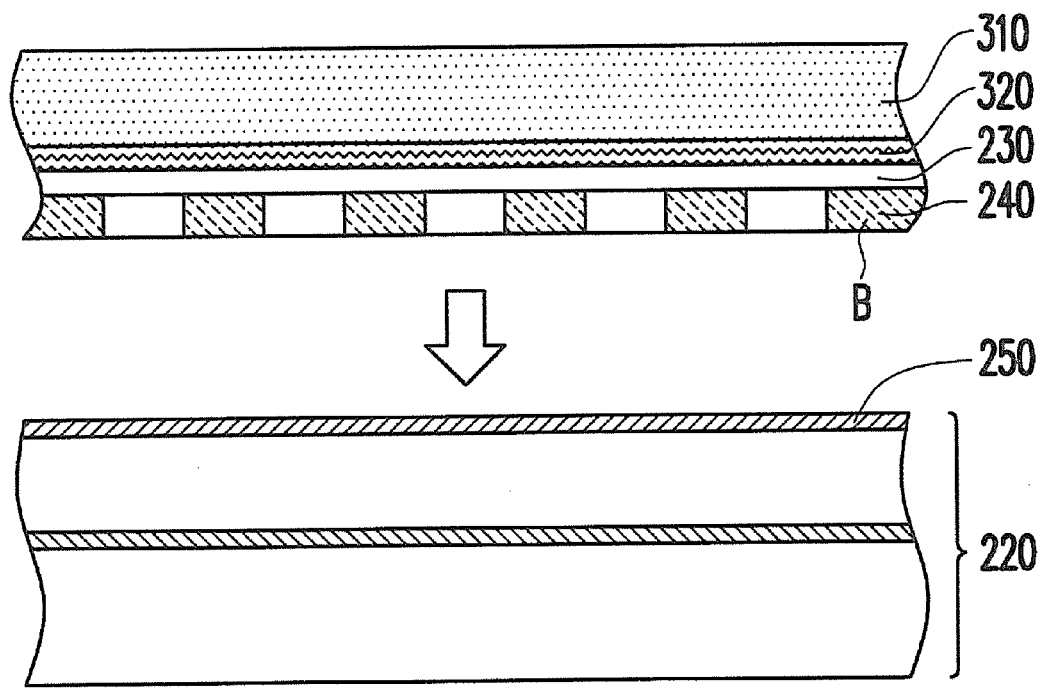
Figure 4F:
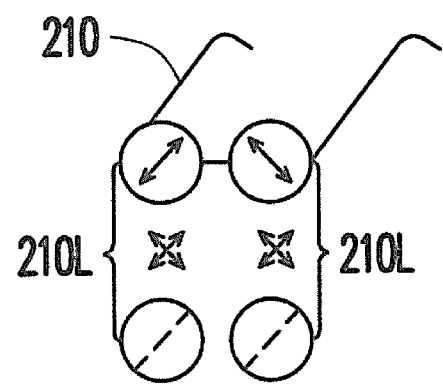
Figure 4F:
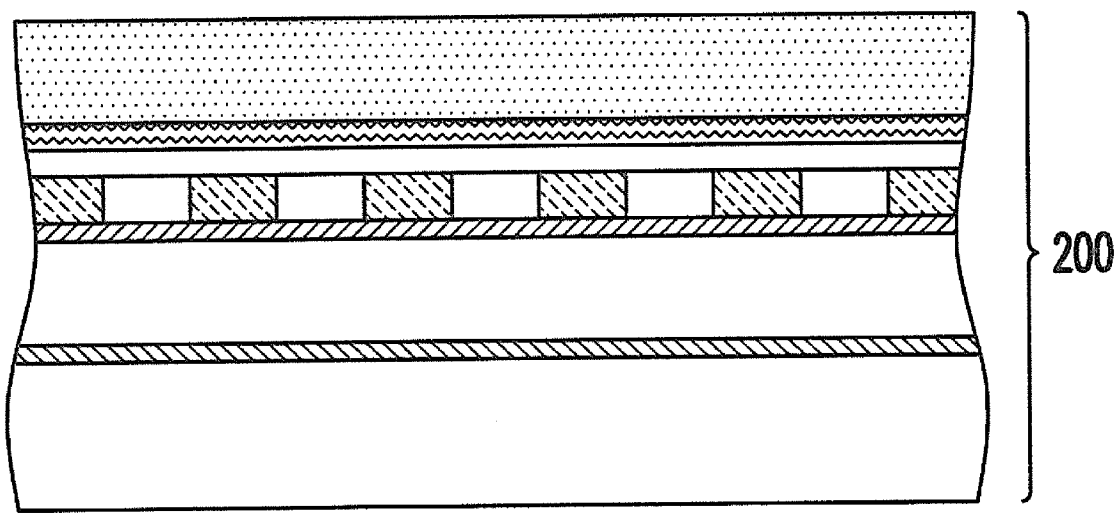

Referring to FIG. 4E, the substrate 310 having the quarter-wave plate 230 and the patterned half-wave plate 240 is aligned and adhered to the flat display panel 220, and the 3D-display 200 after the adhering is shown by FIG. 4F, which is suitable for a viewer wearing a pair of the circular polarized eyeglasses 210 to watch, wherein the circular polarized eyeglasses 210 have two circular polarized eyeglass lenses 210L with two different polarizations.

Second Embodiment

Figure 5:
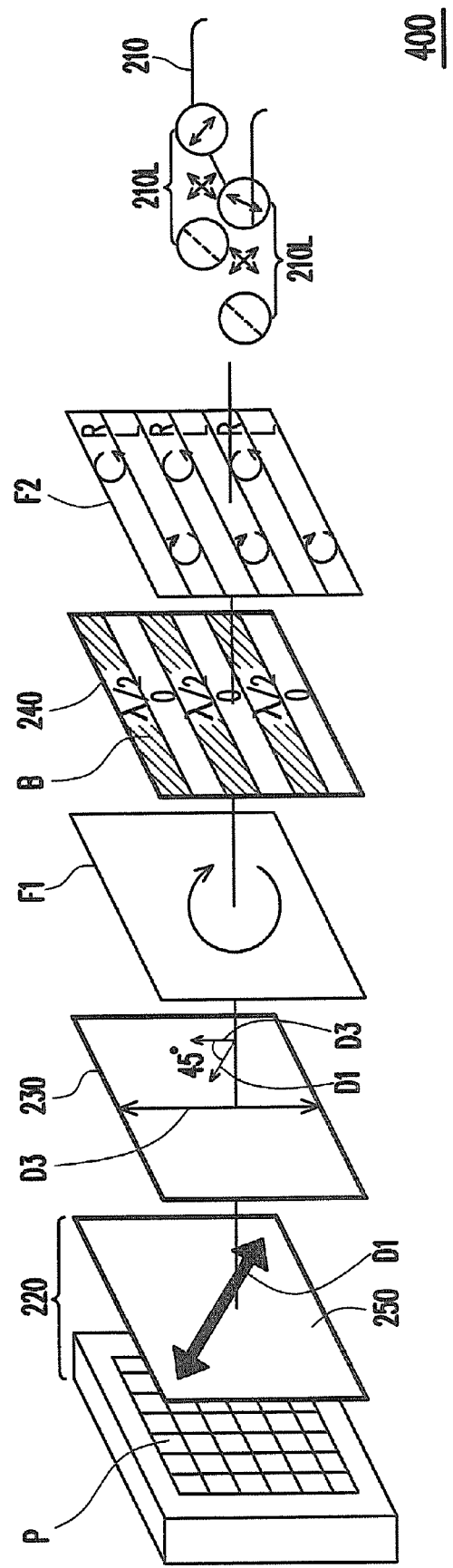
FIG. 5 is a diagram of a 3-D display according to the second embodiment of the present invention.

FIG. 5 is a diagram of a 3-D display according to the second embodiment of the present invention. Referring to FIG. 5, a 3D-display 400 is similar to the 3D-display 200 of the first embodiment except that the quarter-wave plate 230 and the patterned half-wave plate 240 have different disposing positions from that of the 3D-display 200. The quarter-wave plate 230 of the 3D-display 400 herein is disposed on the flat display panel 220, the patterned half-wave plate 240 is disposed on the quarter-wave plate 230 and the quarter-wave plate 230 is located between the patterned half-wave plate 240 and the flat display panel 220.

In the embodiment, the flat display panel 220 has an upper polarized plate 250, wherein the extension direction of the optical axis of the upper polarized plate 250 is D1, which makes the flat display panel 220 suitable to display the linear polarized image with the polarization D1. Next, the quarter-wave phase retardation provided by the quarter-wave plate 230 makes the linear polarized image with the polarization D1 converted into the circular polarized image to be entered into the patterned half-wave plate 240 as shown by the frame F1 in FIG. 5, wherein the circular polarized image is, for example, a left-handed circular polarized image. Next, the image enters into the patterned half-wave plate 240 corresponding to a part of the pixels P. In the embodiment, the patterned half-wave plate 240 includes a plurality of bar patterns B and each bar pattern B respectively corresponds to a row of pixels P in the odd-row pixels P. In particular, the $\lambda/2$ phase retardation provided by the patterned half-wave plate 240 in association with the odd-row pixels P makes the circular polarized image converted into another circular polarized image with an opposite polarization. When the circular polarized image with the opposite polarization enters the circular polarized eyeglasses 210 worn by the viewer, the original left-handed circular polarized image is converted into the right-handed circular polarized image, as shown by FIG. 5.

On the other hand, the phase retardation provided by the patterned half-wave plate 240 in association with the even-row pixels is substantially zero, so that the image presented by the even-row pixels after passing through the patterned half-wave plate 240 would keep the original polarization to enter the circular polarized eyeglasses 210, so that the image of the frame F1 after passing through the patterned half-wave plate 240 produces a frame F2 as shown by FIG. 5, wherein the frame F2 is divided into a plurality of bar-like left eye frame L and a plurality of bar-like right eye frame R both of which are alternately arranged. The viewer wearing a pair of circular polarized eyeglasses 210 at the time is able to see a 3D-image superposed by the left eye frame L and the right eye frame R of the frame F2. The pattern on the patterned half-wave plate 240 can be adjusted in accordance with the application need. The present invention does not limit the shape, size and arrangement of the patterns on the patterned half-wave plate 240. Compared to the prior art in which a linear polarized image is used, the circular polarized image with a circular polarization has substantially the same amounts corresponding to all the components in each polarization; therefore, compared to the conventional 3D-display 100 (shown by FIG. 1), the 3D-display 400 of the embodiment has a better and wider view angle.

Figure 6:
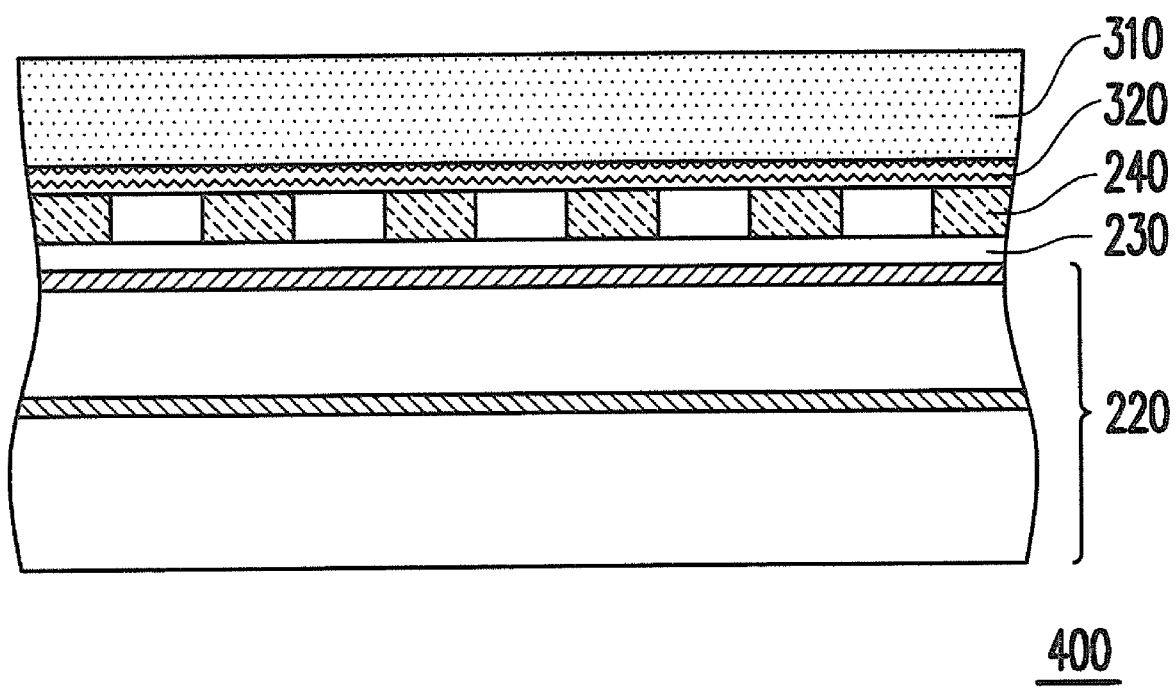
FIG. 6 is a cross sectional diagram of a 3-D display according to the second embodiment of the present invention.

Particularly, the 3D-display 400 includes a substrate 310 and a first alignment layer 320 as shown by FIG. 6. FIG. 3 is a cross sectional diagram of a 3-D display according to the second embodiment of the present invention. Referring to FIG. 6, the first alignment layer 320 is disposed on the patterned half-wave plate 240 and located between the patterned half-wave plate 240 and the substrate 310, wherein the first alignment layer 320 has a specific alignment arrangement for adjusting the optical axes of the quarter-wave plate 230 and the patterned half-wave plate 240. In addition, the quarter-wave plate 230 is located between the patterned half-wave plate 240 and the flat display panel 220. In the embodiment, the optical axis of the quarter-wave plate 230 is parallel to the optical axis of the patterned half-wave plate 240.

Figure 7A:
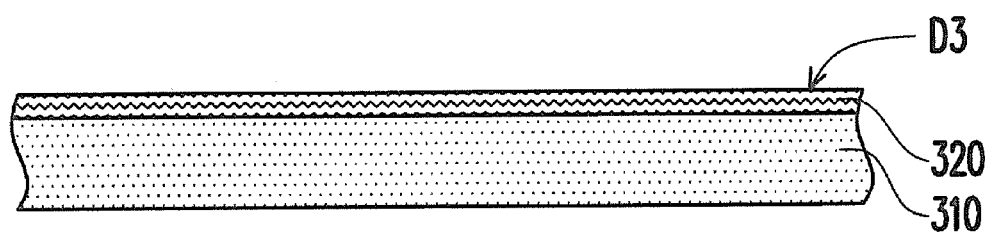
FIGS. 7A-7C are diagrams showing the fabrication method of the above-mentioned substrate in FIG. 6 having a quarter-wave plate and a patterned half-wave plate.
Figure 7B:
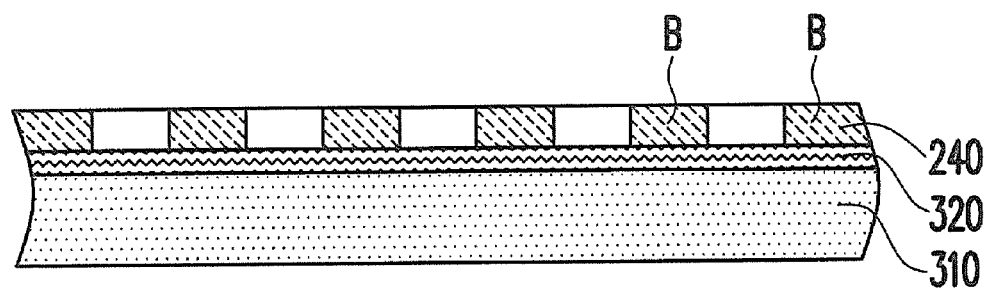
Figure 7C:
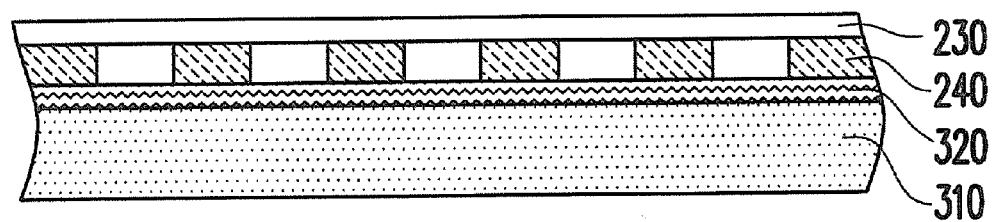

FIGS. 7A-7C are diagrams showing the fabrication method of the above-mentioned substrate in FIG. 6 having a quarter-wave plate and a patterned half-wave plate. First, referring to FIG. 7A, a substrate 310 having a first alignment layer 320 is provided, wherein the alignment direction of the first alignment layer 320 is D3, which makes the optical axis directions of the quarter-wave plate 230 and the patterned half-wave plate 240 become D3. The included angle between the optical axis extension directions D3 of the ¼-λ, plate 230 and the patterned half-wave plate 240 and the optical axis extension direction D1 of the upper polarized plate 250 is 45° (as shown by FIG. 5). Next as shown by FIG. 7B, a patterned half-wave plate 240 is formed on the first alignment layer 320, wherein the patterned half-wave plate 240 corresponds to a part of the pixels P (as shown by FIG. 5). In the embodiment, the patterned half-wave plate 240 comprises, for example, but not limited to, a plurality of bar patterns B with λ/2 phase retardation. The method for forming the above-mentioned patterned half-wave plate 240 includes, for example, overall coating a phase difference film on the first alignment layer 320 with slot-die coating or spin coating. Next, a photomask process is used to define the required bar patterns B so as to form a plurality of blocks with λ/2 phase retardation and a plurality of blocks with substantially zero phase retardation on the patterned half-wave plate 240. In the embodiment, the blocks with λ/2 phase retardation and the blocks with zero phase retardation respectively have almost the same film thickness. Next, as shown by FIG. 7C, a quarter-wave plate 230 is formed on the patterned half-wave plate 240, wherein the method for forming the quarter-wave plate 230 is, for example, overall coating a phase difference film on the patterned half-wave plate 240 with, for example, slot-die coating or spin coating through UV (ultraviolet) cross-linking so as to complete the quarter-wave plate 230 and the patterned half-wave plate 240. Further, the substrate 310 having the quarter-wave plate 230 and the patterned half-wave plate 240 is aligned and adhered to the flat display panel 220 to complete the 3D-display 400.

Figure 8:
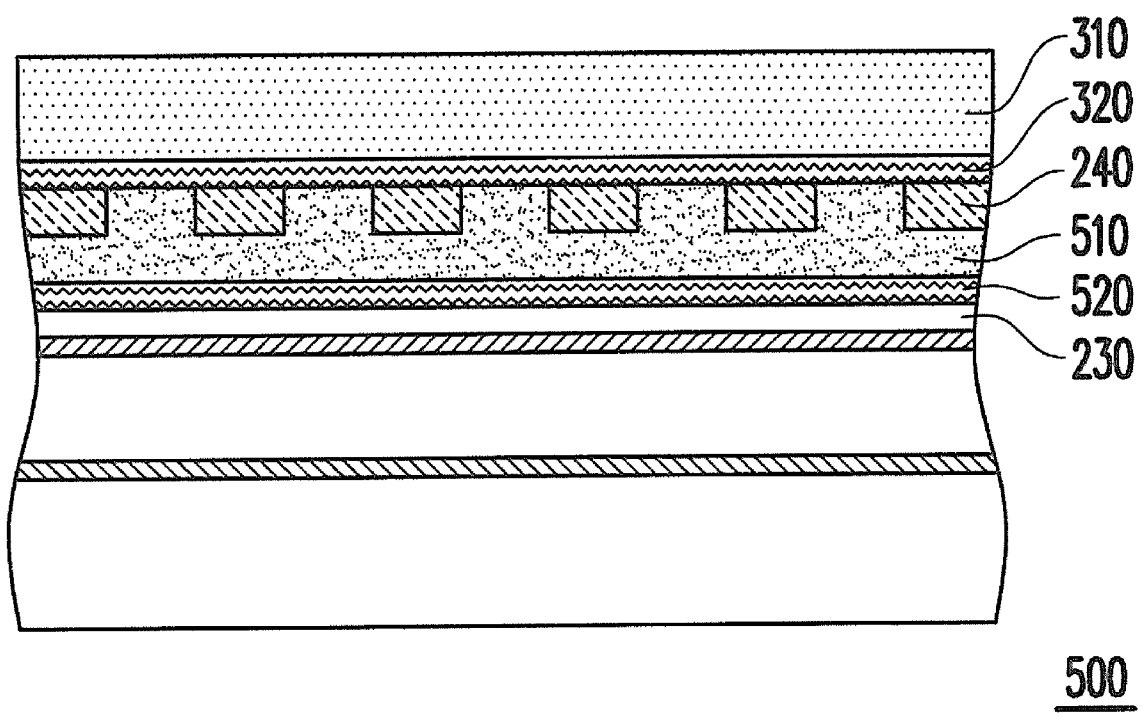
FIG. 8 is a cross sectional diagram of another 3-D display according to the second embodiment of the present invention.

In other embodiments, considering the film thickness of the quarter-wave plate 230 may be varied with the topography of the bottom of the patterned half-wave plate 240 to make the film thickness of the quarter-wave plate 230 not even and further to affect the optical behavior of the 3D-display 400. Therefore, when the film thickness difference between the regions with the λ/2 phase retardation and the regions with the substantially zero phase retardation is too large, the 3D-display further includes a covering layer 510 and a second alignment layer 520. FIG. 8 is a cross sectional diagram of another 3-D display 500 according to the second embodiment of the present invention. Referring to FIG. 8, a covering layer 510 is disposed between the quarter-wave plate 230 and the patterned half-wave plate 240 and the second alignment layer 520 is disposed between the covering layer 510 and the quarter-wave plate 230. The covering layer 510 is for filing and smoothing the topography of the surface of the patterned half-wave plate 240, so that the quarter-wave plate 230 can be more evenly coated on the surface of the covering layer 510 to further avoid the quarter-wave plate 230 from the influence of the surface pattern of the patterned half-wave plate 240 which may results in uneven coating. In addition, the first alignment layer 320 is employed for defining the optical axis of the patterned half-wave plate 240 and the second alignment layer 520 is employed for defining the optical axis of the quarter-wave plate 230. In the embodiment, the first alignment layer 320 and the second alignment layer 520 have a same alignment direction.

Figure 9A:
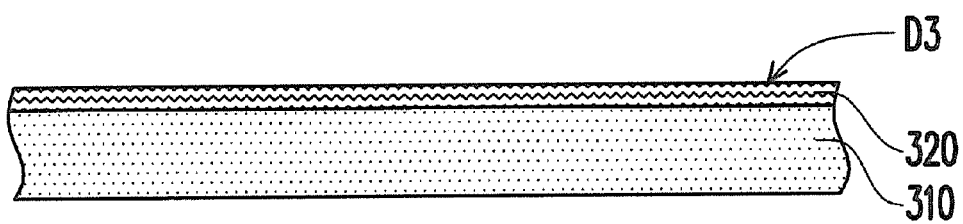
FIGS. 9A-9E are diagrams showing the fabrication method of the above-mentioned substrate in FIG. 8 having a quarter-wave plate and a patterned half-wave plate.
Figure 9B:
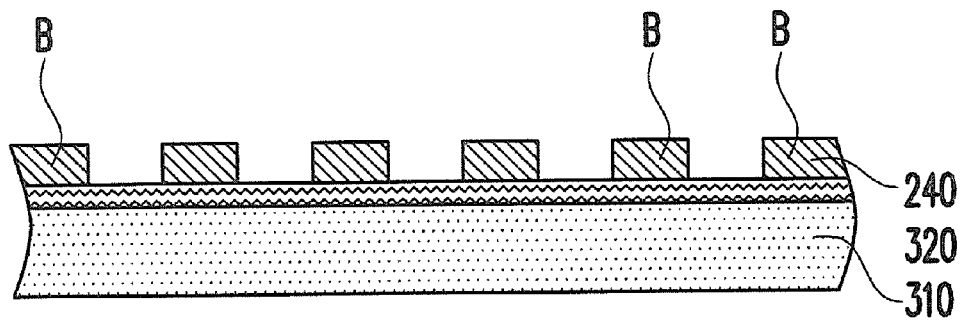

FIGS. 9A-9E are diagrams showing the fabrication method of the above-mentioned substrate in FIG. 8 having a quarter-wave plate and a patterned half-wave plate. First, referring to FIG. 9A, a substrate 310 having a first alignment layer 320 is provided, wherein the alignment direction of the first alignment layer 320 is D3. Next as shown by FIG. 9B, a patterned half-wave plate 240 is formed on the first alignment layer 320, wherein the patterned half-wave plate 240 corresponds to a part of the pixels P (as shown by FIG. 5). In the embodiment, the patterned half-wave plate 240 comprises, for example, but not limited to, a plurality of bar patterns B with λ/2 phase retardation. The method for forming the above-mentioned patterned half-wave plate 240 includes, for example, overall coating a phase difference film on the first alignment layer 320. Next, a photomask process is used to define the pattern with λ/2 phase retardation and then a developing process is used to remove the regions with substantially zero phase retardation so as to form the patterned half-wave plate 240 with uneven topography.

Figure 9C:
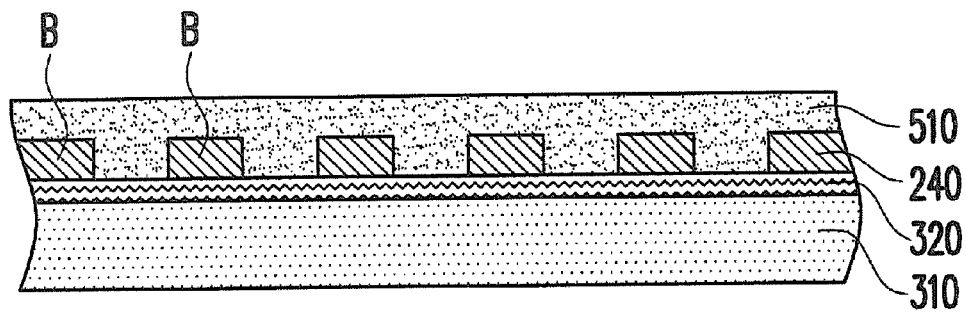
Figure 9D:
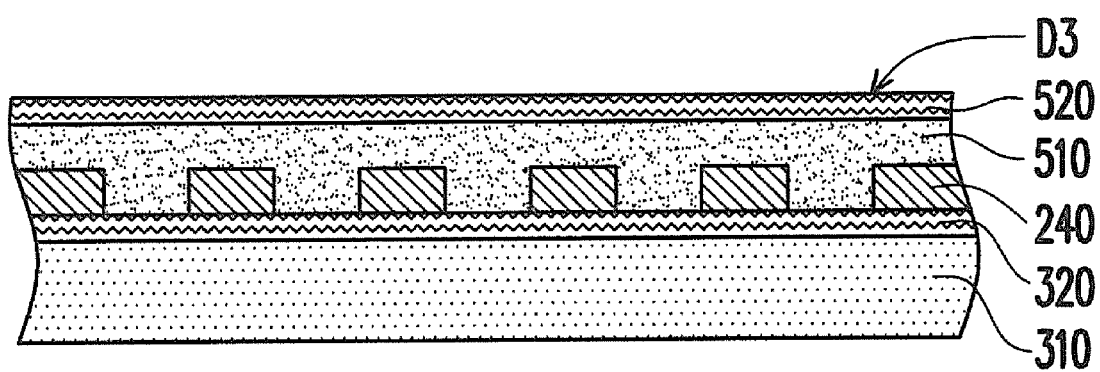
Figure 9E:
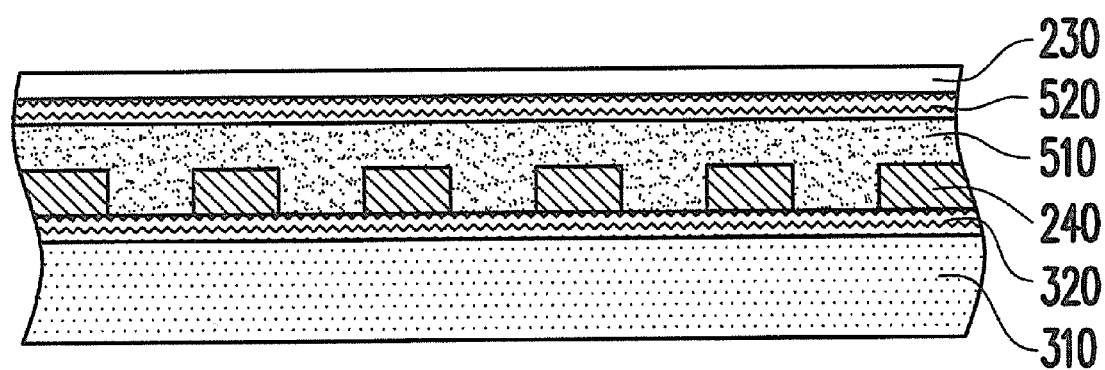

Still referring to FIG. 9C, a covering layer 510 is formed on the patterned half-wave plate 240 to cover the pattern on the patterned half-wave plate 240. Next as shown in FIG. 9D, a second alignment layer 520 is formed on the covering layer 510, wherein the second alignment layer 520 and the first alignment layer 320 have a same alignment direction D3, and the fabrication method of the second alignment layer 520 is similar to that of the first alignment layer 320. Next, as shown by FIG. 9E, the quarter-wave plate 230 is formed on the second alignment layer 520. Next, the substrate 310 having the quarter-wave plate 230 and the patterned half-wave plate 240 is aligned and then adhered to the flat display panel 220 (as shown by FIG. 5) to complete the 3D-display 500.

Figure 10:
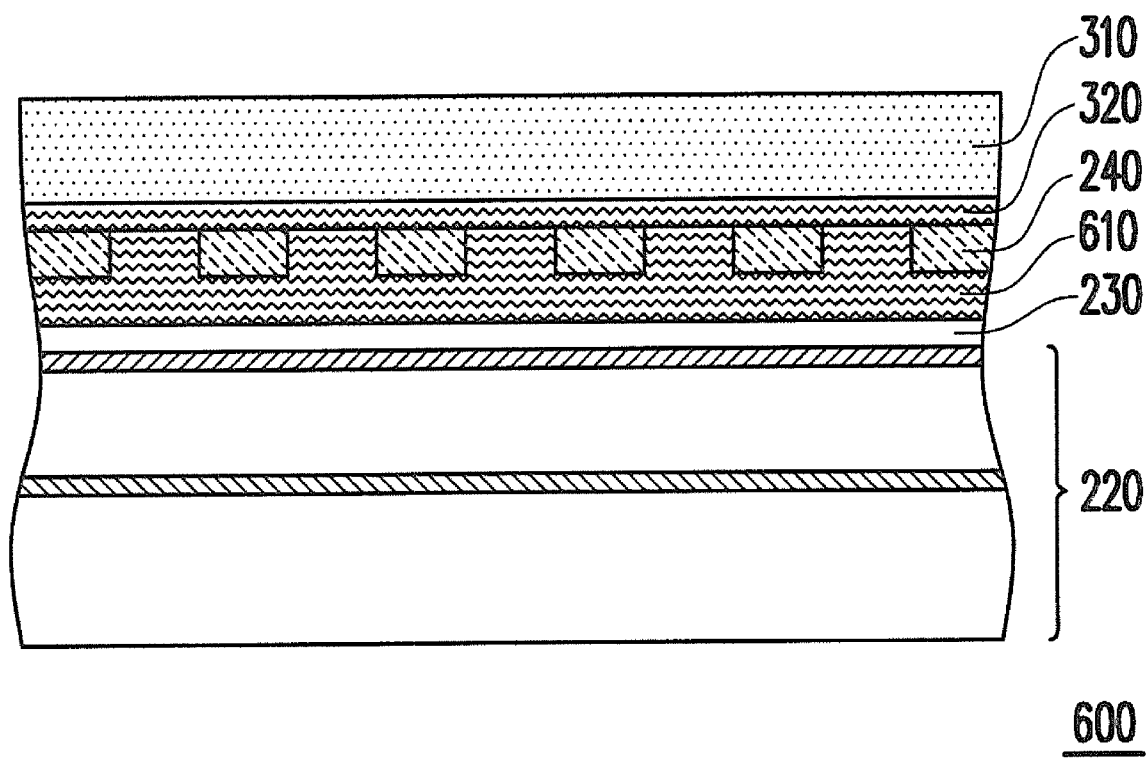
FIG. 10 is cross sectional diagram of yet another 3-D display according to the first embodiment of the present invention.

In another embodiment, the covering layer 510 and the second alignment layer 520 can be substituted by a covering layer 610 with alignment function, as shown by FIG. 10. FIG. 10 is a cross sectional view of yet another 3-D display according to the first embodiment of the present invention. Referring to FIG. 10, a 3D-display 600 can further include a covering layer 610 with alignment function, as shown by FIG. 10. The covering layer 610 with alignment function is disposed between the quarter-wave plate 230 and the patterned half-wave plate 240, and the optical axis of the quarter-wave plate 230 is parallel to that of the patterned half-wave plate 240. The quarter-wave plate 230 is located between the flat display panel 220 and the covering layer 610 with alignment function.

Figure 11A:
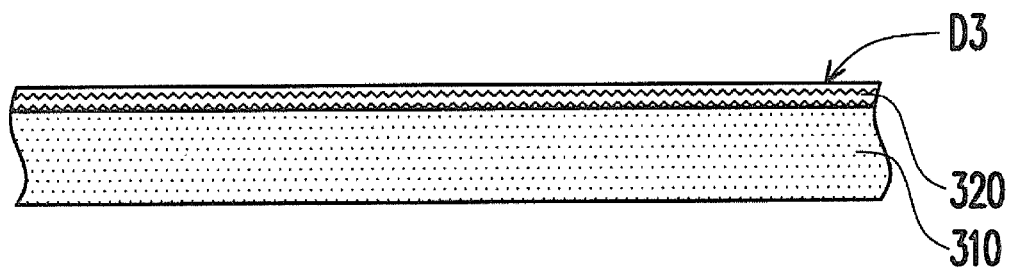
FIGS. 11A-11D are diagrams showing the fabrication method of the above-mentioned substrate in FIG. 10 having a quarter-wave plate and a patterned half-wave plate.
Figure 11B:
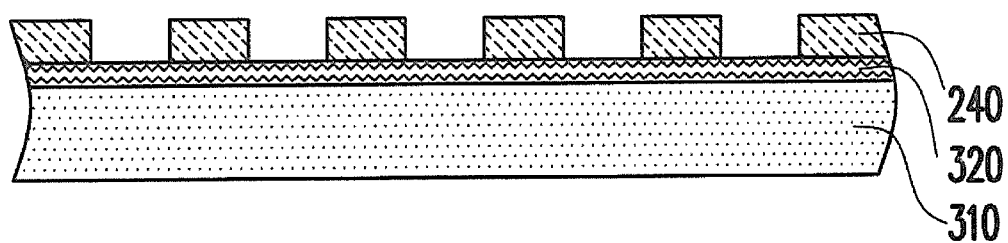
Figure 11C:
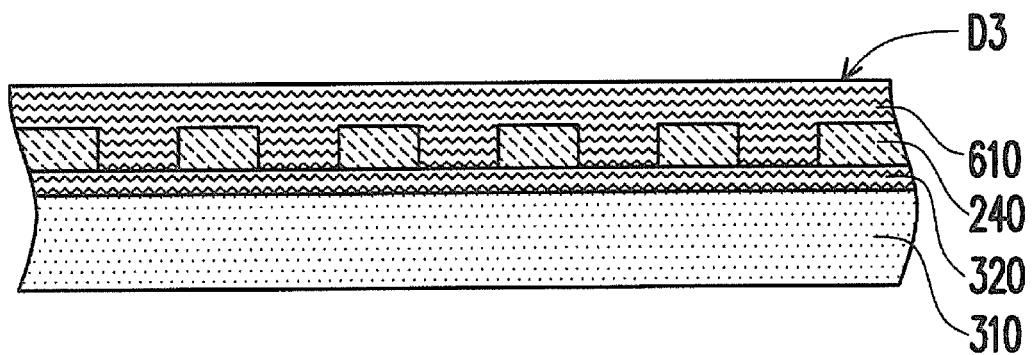
Figure 11D:
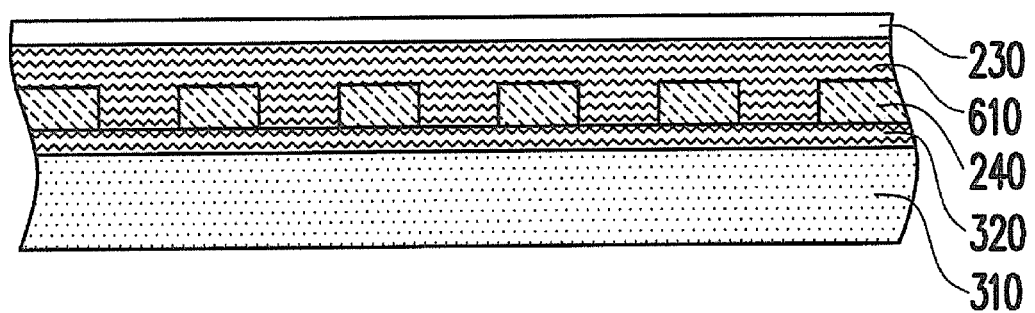

FIGS. 11A-11D are diagrams showing the fabrication method of the above-mentioned substrate in FIG. 10 having a quarter-wave plate and a patterned half-wave plate. First referring to FIG. 11A, a substrate 310 having the first alignment layer 320 is provided, wherein the alignment direction of the first alignment layer 320 is D3. Next, as shown in FIG. 11B, a patterned half-wave plate 240 is formed on the first alignment layer 320, wherein the fabrication method with the required design considerations are similar to that shown in FIG. 9B, and therefore is omitted to describe. Next, referring to FIG. 11C, a covering layer 610 with alignment function is formed on the patterned half-wave plate 240 to cover the pattern on the patterned half-wave plate 240, wherein the alignment direction of the covering layer 610 with alignment function is the same as the alignment direction D3 of the first alignment layer 320. Next, as shown by FIG. 11D, a quarter-wave plate 230 is formed on the covering layer 610 with alignment function. Next, the substrate 310 having the quarter-wave plate 230 and the patterned half-wave plate 240 is aligned with and then adhered with the flat display panel 220 (as shown by FIG. 5) to complete the 3D-display 600.

In summary, the 3D-display and the fabrication method thereof provided by the present invention have at least following advantages:

1. The different regions of the patterned half-wave plate provided by the present invention have different phase retardations and a quarter-wave plate is used to convert a linear polarized image into a circular polarized image. Therefore, a viewer is able to watch the 3D-display having a low dependence on view angle.

2. The optical axis of the quarter-wave plate is parallel to the optical axis of the patterned half-wave plate in the present invention. In some embodiments, even a single alignment layer is enough for integrating the quarter-wave plate and the patterned half-wave plate, which largely simplifies the processes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A three-dimension display, suitable for a viewer wearing a pair of eyeglasses, wherein the eyeglasses have two circular polarized eyeglass lenses with different polarizations, the three-dimension display comprising:
   a flat display panel having a plurality of pixels arranged in an array, wherein the flat display panel is suitable to display a linear polarized image;
   a quarter-wave plate adhered on the flat display panel and located between the flat display panel and the eyeglasses; and
   a patterned half-wave plate disposed on the quarter-wave plate, wherein the quarter-wave plate is located between the patterned half-wave plate and the flat display panel and the patterned half-wave plate corresponds to a part of the pixels.

2. The three-dimension display according to claim 1, wherein the flat display panel comprises a liquid crystal display panel with a linear polarized plate, an organic electroluminescent display panel with a linear polarized plate, a plasma display panel with a linear polarized plate or an electro-wetting display panel with a linear polarized plate.

3. The three-dimension display according to claim 1, further comprising:
   a substrate; and
   a first alignment layer disposed on the patterned half-wave plate and located between the patterned half-wave plate and the substrate.

4. The three-dimension display according to claim 3, further comprising:
   a covering layer disposed between the quarter-wave plate and the patterned half-wave plate; and
   a second alignment layer disposed between the covering layer and the quarter-wave plate.

5. The three-dimension display according to claim 3, further comprising a covering layer with alignment function, disposed between the quarter-wave plate and the patterned half-wave plate.

6. The three-dimension display according to claim 1, wherein the optical axis of the quarter-wave plate is parallel to the optical axis of the patterned half-wave plate.

7. The three-dimension display according to claim 1, wherein the patterned half-wave plate comprises a plurality of bar patterns, and each of the bar pattern respectively corresponds to the pixels of a row in the even-rows.

8. The three-dimension display according to claim 1, wherein the patterned half-wave plate comprises a plurality of bar patterns, and each of the bar pattern respectively corresponds to the pixels of a row in the odd-rows.

9. The three-dimension display according to claim 1, wherein the patterned half-wave plate comprises a plurality of bar patterns, and each of the bar pattern respectively corresponds to the pixels of a column in the even-columns or the pixels of a column in the odd-columns.

10. The three-dimension display according to claim 1, wherein the patterned half-wave plate comprises a plurality of island patterns, and each of the island patterns respectively corresponds to at least one of the pixels.

11. The three-dimension display according to claim 10, wherein the island patterns are alternately arranged in the column direction and in the row direction.

* * * * *